United States Patent
Le chevalier et al.

(10) Patent No.: US 12,165,195 B1
(45) Date of Patent: Dec. 10, 2024

(54) METHODS AND SYSTEMS FOR PRODUCT DISPLAY VISUALIZATION IN AUGMENTED REALITY PLATFORMS

(71) Applicant: Wells Fargo Bank, N.A., San Francisco, CA (US)

(72) Inventors: Vincent Le chevalier, San Jose, CA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 303 days.

(21) Appl. No.: 17/645,386

(22) Filed: Dec. 21, 2021

Related U.S. Application Data (62) Division of application No. 15/389,719, filed on Dec. 23, 2016, now Pat. No. 11,238,526.

(51) Int. Cl.
```
G06Q 30/00      (2023.01)
G06F 16/248     (2019.01)
G06F 16/9535    (2019.01)
G06Q 30/0601    (2023.01)
G06T 19/00      (2011.01)
```

(52) U.S. Cl.
CPC ....... *G06Q 30/0643* (2013.01); *G06F 16/248* (2019.01); *G06F 16/9535* (2019.01); *G06Q 30/0635* (2013.01); *G06T 19/006* (2013.01)

(58) Field of Classification Search
CPC ...... G06Q 30/0601–0645; G06Q 30/08; G06F 16/9535; G06F 16/248; G06T 19/006
USPC .................................. 705/26.1–27.2
See application file for complete search history.

(56) References Cited

U.S. PATENT DOCUMENTS

| | | |
|---|---|---|
| 8,638,190 B1 | 1/2014 | Want et al. |
| 8,667,528 B2 | 3/2014 | Yu et al. |
| 9,230,367 B2 | 1/2016 | Stroila |
| 9,336,541 B2 | 5/2016 | Pugazhendhi et al. |
| 9,342,559 B1 | 5/2016 | Jedrzejowicz |
| 11,094,002 B1 | 8/2021 | Allin et al. |
| 2007/0073592 A1* | 3/2007 | Perry ............ G06Q 30/0603 705/26.1 |
| 2011/0014351 A1 | 1/2011 | Reider et al. |
| 2011/0265039 A1 | 10/2011 | Lyon et al. |
| 2011/0306400 A1 | 12/2011 | Nguyen |
| 2012/0062596 A1 | 3/2012 | Bedi et al. |
| 2012/0069052 A1 | 3/2012 | Lee et al. |
| 2012/0075345 A1 | 3/2012 | Lee et al. |
| 2012/0116920 A1 | 5/2012 | Adhikari et al. |

(Continued)

OTHER PUBLICATIONS

US 9,245,386 B2, 01/2016, Adhikari et al. (withdrawn)

(Continued)

*Primary Examiner* — Jeffrey A. Smith
*Assistant Examiner* — Lindsey B Smith
(74) *Attorney, Agent, or Firm* — Merchant & Gould P.C.

(57) ABSTRACT

Using augmented reality (AR) to display information regarding products and services that are comparable or related to a product or service that a user of the AR device is viewing or may consider purchasing. For example, in response to scanning a particular product, an AR device may display one or more products comparable or related to the scanned product. These products may be presented to the user as a digital visualization wall of products, wherein the digital visualization wall is dynamically rendered in real-time and viewable from the AR device.

16 Claims, 8 Drawing Sheets

(56) References Cited

U.S. PATENT DOCUMENTS

| | | | |
|---|---|---|---|
| 2012/0215655 A1 | 8/2012 | Shedletsky, III | |
| 2013/0054327 A1 | 2/2013 | Ross et al. | |
| 2013/0249947 A1 | 9/2013 | Reitan | |
| 2013/0262450 A1 | 10/2013 | Melcher et al. | |
| 2014/0100997 A1* | 4/2014 | Mayerle .............. | G06T 19/006 705/27.2 |
| 2014/0172570 A1 | 6/2014 | y Arcas et al. | |
| 2014/0317539 A1 | 10/2014 | Unpingco et al. | |
| 2014/0365334 A1* | 12/2014 | Hurewitz .......... | G06Q 30/0613 705/26.41 |
| 2015/0095228 A1 | 4/2015 | Su et al. | |
| 2015/0242922 A1 | 8/2015 | Zamer | |
| 2015/0279106 A1* | 10/2015 | Blanchflower ....... | G06T 15/20 345/2.2 |
| 2015/0310539 A1* | 10/2015 | McCoy ............ | G06Q 30/0639 705/27.1 |
| 2016/0071149 A1* | 3/2016 | Farshori ............. | G06T 19/006 705/14.51 |
| 2016/0117863 A1* | 4/2016 | Pugazhendhi ..... | G06Q 30/0281 705/26.7 |
| 2016/0253746 A1 | 9/2016 | Morrison | |
| 2017/0324841 A1 | 11/2017 | Clement et al. | |
| 2018/0088677 A1 | 3/2018 | Zhang et al. | |
| 2018/0150899 A1* | 5/2018 | Waldron .............. | G06F 3/017 |

OTHER PUBLICATIONS

Ryan, Tom, Google-powered 3-D loyalty app hits retail, Jun. 7, 2014, RetailWire.com, accessed at [https://retailwire.com/discussion/google-powered-3-d-loyalty-app-hits-retail/] (Year: 2014).*

Tully, Jim et al., "Internet of Things Primer for 2016," Mar. 31, 2016, 8 pages.

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al., "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

Ahn, Junho et al., "Supporting healthy grocery shopping via mobile augmented reality," ACM Transactions on Multimedia Computing, Communications, and Applications (TOMM) 12.1s (2015): 1-24. (Year: 2015).

El Sayed, Neven Am et al., "Situated analytics: Demonstrating immersive analytical tools with augmented reality," Journal of Visual Languages & Computing 36 (2016): 13-23. (Year: 2016).

Takahashi, Dean, "IBM launches augmented reality app for grocery stores," VentureBeat, Jul. 1, 2021, 3 pages.

* cited by examiner

METHODS AND SYSTEMS FOR PRODUCT DISPLAY VISUALIZATION IN AUGMENTED REALITY PLATFORMS

BACKGROUND

When individuals shop for products at a store, they are limited in the number of products available to them and limited in the variety of products offered by that particular store. Oftentimes individuals may not be aware of the alternative products available to them nor the cost associated therewith. Accordingly, poor or less than desirable purchasing decisions may occur based on a lack of awareness of alternative products, prices, and options.

SUMMARY

Embodiments of the disclosure are directed to methods and systems implemented by an augmented reality device or a method implemented by a server computer. In a first aspect, disclosed is a method for identifying products using a server computer, the method comprising: receiving, at the server computer, an image associated with at least one of a product and a service; identifying, by the server computer, the at least one of the product and the service; generating, by the server computer, a list including at least one of: a plurality of associated products and a plurality of associated services; and sending, from the server computer, the list to an augmented reality device.

In another aspect, disclosed is a method for displaying a digital visualization wall on an augmented reality device, the method comprising: capturing an image associated with one of a product and a service; generating a list, the list including at least one of: a plurality of associated products and a plurality of associated services; generating a digital visualization wall including the at least one of: the plurality of associated products or the plurality of associated services; and displaying the digital visualization wall from the augmented reality device.

In yet another aspect, disclosed is an augmented reality computing device comprising: a processing unit; and system memory, the system memory including instructions which, when executed by the processing unit, cause the augmented reality computing device to: capture an image associated with one of a product and a service; generate a list, the list including at least one of: a plurality of associated products and a plurality of associated services; generate a digital visualization wall including the plurality of associated products or the plurality of associated services, wherein the digital visualization wall is represented as a grid of items, wherein each item is representative of one of the plurality of products or the plurality of services; and display the digital visualization wall from the augmented reality device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

The present disclosure is directed to systems and methods for using augmented reality (AR) to display information regarding products and services that are comparable or related to a product or service that a user of the AR device is viewing or may consider purchasing.

For example, in response to scanning a particular product, an AR device may display one or more products comparable or related to the scanned product. These products may be presented to the user as a digital visualization wall of products, wherein the digital visualization wall is dynamically rendered in real-time and viewable from the AR device.

The disclosed systems and methods further disclose an application that can be installed on or executed by the AR device, wherein the application can instruct a camera of the AR device to scan a product, an advertisement, or brochure displaying a product, a service, a URL, a company logo. The application can also display the digital visualization wall from the AR device. In some embodiments, the digital visualization wall may display additional information such as, for example, a price associated with each displayed product, fees associated with each displayed service, a web address or store identifier describing where the product or service can be purchased, product and service specifications, product alternatives (e.g., available colors, sizes), and other information about the displayed product or service. Furthermore, the user may have the ability to purchase the one or more products or services displayed on the digital visualization wall.

In some embodiments, the individual using the AR device may be a customer of a financial institution. In this disclosure, the individual may also be referred to as a customer or a user. In one example implementation, the customer may initially scan a product the customer is interested in purchasing using an AR device. In other embodiments, the customer may be located in a store selling services or may view, using the AR device, an advertisement associated with a business that sells services (e.g., a financial institution such as a bank or any other service providing business). A server of a company, such as a financial institution associated with the application that is installed on or executed from the AR device may query one or more online databases to generate a list of products and services that can be displayed on the digital visualization wall. In some embodiments, the online databases that are queried belong to third party businesses such as, for example, retail stores, service providing businesses, or any business selling goods or services.

In some embodiments, the financial institution may store the customer's financial information and use that information to display, on the digital visualization wall, only those products or services that the customer can afford. In other embodiments, no such financial information is taken into consideration.

The systems and methods disclosed herein are directed to computer technology that can improve an efficiency of a shopping experience for a user of an AR device. The systems and methods permit a server computer to automatically identify products and services that the user has expressed interest in purchasing. In some embodiments, the systems and methods can automatically determine and display, on a digital visualization wall, products or services that are comparable or related to the product or service the customer is currently considering purchasing. In addition, the systems and methods can permit the user to purchase the products or services from the AR device.

Figure 1:
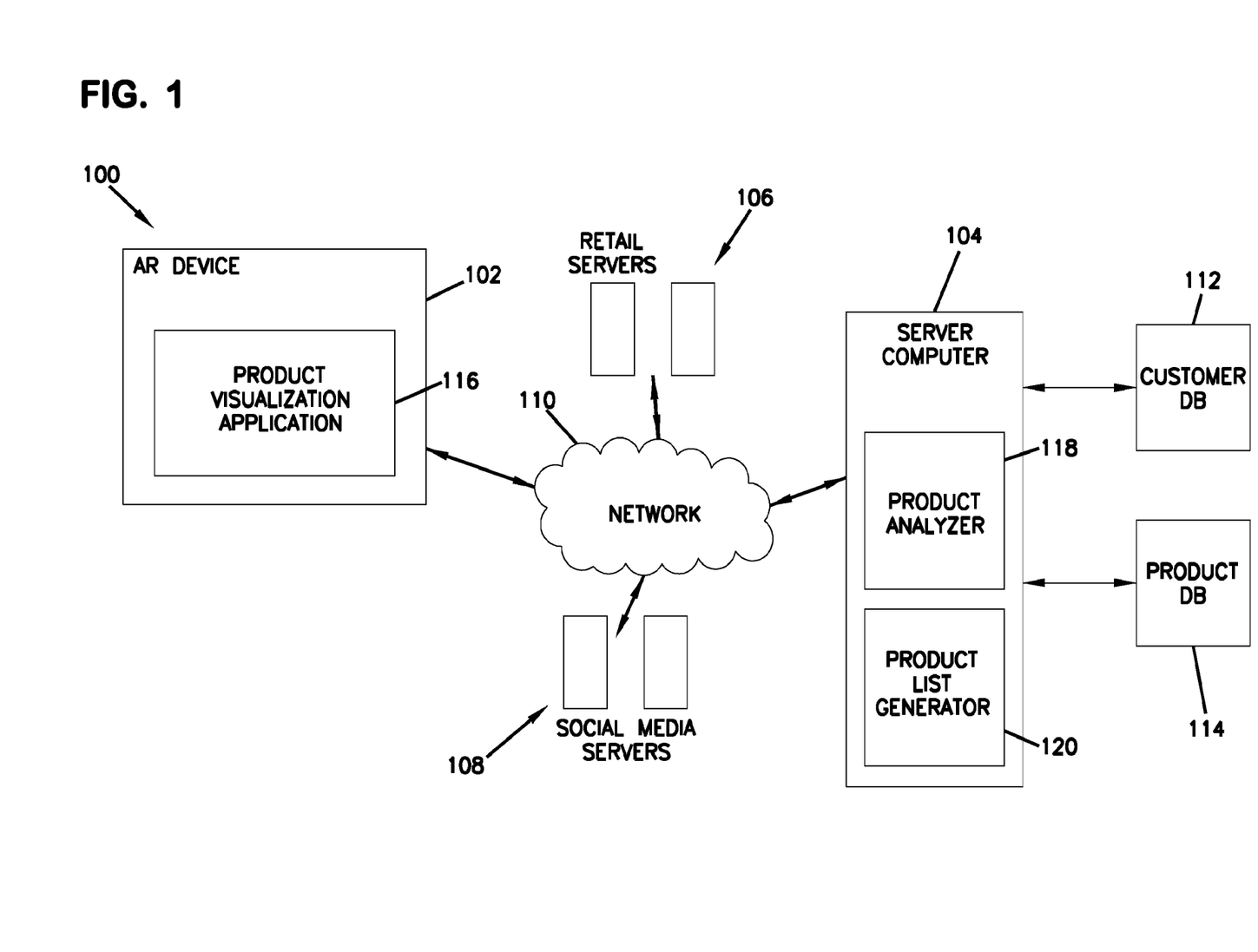
FIG. 1 shows an example system that can support the use of augmented reality (AR) to display comparable products and services on a digital visualization wall.

FIG. 1 shows an example system 100 that can support the use of augmented reality (AR) to display comparable products and services on a digital visualization wall.

The example system 100 includes an AR device 102, a server computer 104, one or more retail servers 106, and one or more social media servers 108, each connected to a communication network 110. Further included in the system 100 is a customer database 112 and a product database 114 in communication with the server computer 104. Additionally, in this system 100, the AR device 102 includes, among other features, a product visualization application 116.

The example AR device 102 is an electronic computing device with an AR functionality that can be worn or carried by the customer. An example of an AR device that may be worn by the user is an AR headset. An example of an AR device that may be carried by the user is a smart telephone or tablet computer that includes AR components such as a processor, display and camera and AR software applications. In some embodiments, the smart phone or tablet computer can display a virtual image on a display screen of the smart phone or tablet computer.

In an example, the AR device 102 such as, for example, an AR headset, includes a computer, such as a wearable computer, a camera, an optical display, and even a GPS device. The wearable computer may further include a wireless telecommunication capability, permitting a wireless communication to any of the servers and databases illustrated in FIG. 1. The wearable computer also includes voice recognition capability, permitting the user to direct the wearable computer via voice commands. Alternatively or additionally, the wearable computer may accept hand gestures, eye gestures, head gestures, or any combination thereof as commands to direct the wearable computer. The optical display projects virtual images and also permits the user to see through the display. An example of an AR headset is Google Glass, from Google Inc. of Mountain View, CA.

The example product visualization application 116 is an application that can be installed on the AR device 102. Alternatively or additionally, the product visualization application 116 can be installed remotely and executed by the AR device 102. In some embodiments, the product visualization application 116 can detect a product, using, for example the camera of the AR device 102 to scan the product itself and other aspects of the product (including a bar code, packaging text, product text, etc.).

In some embodiments, the camera of the AR device 102 may scan other information such as, for example, the store in which the customer is located by scanning the business signage, logos, or other identifying marks within the business, such as, for example, a financial institution. In another example, the AR device may scan advertisements, posters, or brochures to detect a product or service.

As will be described in further detail herein, the product visualization application 116 may send the image of the scanned product, service, business, etc. to the server computer 104 over the network 110. As will be described in further detail herein, the server computer 104 may identify the product. However in other embodiments, the product visualization application 116 may additionally or alternatively identify the product.

Furthermore, the product visualization application 116 may also display virtual images to the customer. As will be described in further detail herein, the product visualization application 116 may receive, from the server computer 104, a list of one or more products or services and one or more virtual images associated with each of the one or more products and services. The virtual images may be, for example, an image of the comparable or related product or some other image characterizing the comparable or related product. The virtual images may further be an image of the business selling the product or service. The product visualization application 116 may also receive product information such as, for example, product specifications, one or more product prices, and information regarding where the comparable or related product may be purchased (e.g., business website URLs, store location information, business contact information, etc.), etc.

Similarly, the product visualization application 116 may also receive service information such as, for example, the type of service, details about the service, fees, rates, information regarding where the comparable or related service may be purchased. In some embodiments, the product visualization application 116 may display the received virtual images and corresponding information on a digital visualization wall. In some examples, the product visualization application 116 generates the digital visualization wall and populates the digital visualization wall with one or more products, services, or a combination of both. However, in other embodiments, the product visualization application 116 receives the digital visualization wall from the server computer 104 and therefore only displays the digital visualization wall generated by the server computer 104. The product visualization application 116 also determines appropriate locations and positions at which to display the virtual objects. Alternatively or additionally, in some embodiments, the locations and positions at which to display the virtual objects may be determined by the server computer 104.

Furthermore, the product visualization application 116 may permit the user to directly purchase a product or service displayed on the digital visualization wall. As will be described in further detail herein, the product visualization application 116 may allow the customer to select a product or service displayed on the digital visualization wall and purchase the selected product or service. In some embodiments, purchasing the selected product or service may require communication with a retail server, such as retail server 106.

In some aspects, network 106 is a computer network such as an enterprise intranet and/or the Internet. The example network 106 may include a Local Area Network (LAN), a Wide Area Network (WAN), the Internet, wireless and wired transmission mediums. In further aspects, server computing devices as described herein may communicate with some components of the system 100 via a local network (e.g., an enterprise intranet), whereas such server computing devices may communicate with other components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

The example server computer 104 is a server computer of a financial institution such as a bank. In some embodiments, the customer has one or more financial accounts at the financial institution. Server computer 104 can store financial records for the customer or at another server computer or database accessible from server computer 104 such as, for example, the customer database 112. In this example, the server computer 104 includes a product analyzer 118 and a product list generator 120. The product analyzer 18 and the product list generator 120 are described in further detail herein.

The example system 100 further includes a customer database 112 and a product database 114. In some embodiments, the customer database 112 stores customer information such as, for example customer account information, financial information (e.g., credit card information, savings account information, debit card information, checking account information, etc.), purchase history, scan history, favorite store information, favorite website information, family information, etc. In other embodiments, the customer database 112 stores additional customer information such as, for example, the customer's social media account information.

The customer database 112 may also store customer preferences such as, for example, the amount of money the customer is willing to spend on products, services, or categories of products and services (e.g., the customer may set a limit on the amount of money the customer wishes to spend on toys and may set another limit on the amount of money the customer wishes to spend on home goods).

The customer database 112 may also store information regarding the customer's financial health. For example, the customer database 112 may store the customer's budget information in order to determine products and services the customer can afford. Accordingly, the customer database 112 may store financial and other personal information of the customer of the AR device 102.

In some embodiments, the example customer database 112 may also capture personal customer data and build a personal profile for the customer. The personal customer data can be captured from a plurality of sources including a scan of the customer's mobile and desktop browser history, a scan of the customer's purchase history using the AR device 102 or from other sources (e.g., analyzing the customer's transaction history to identify one or more stores or websites in which the customer shops). In some embodiments, the customer must opt in and allow the customer database 112 to gather such information to build a customer profile.

In some embodiments, the product visualization application 116 of the AR device 102 may authenticate the customer in order to provide access to the customer's account information stored in the customer database 112 as well as provide personalized options (e.g., personalized display options, personalized AR device options, etc.). In an example, the product visualization application 116 may require a user identification and password or even biometric information such as a fingerprint or eye scan in order to identify and verify a particular customer.

The example product database 114 may store product and service information. For example, the product database 114 may scrape product and service information from several sources (e.g., retail servers 106) to generate a list of products, product information, services, and service information. Product information may include, for example, businesses or websites that sell the product, the product price associated with each seller, and product specifications. Similarly, service information may include, for example, businesses or websites that sell certain services, the fees or rates associated with such services, and details about the service.

In some embodiments, the product database 114 updates automatically on a periodic basis. In other embodiments, the product database 114 updates in response to a user or system administrator's instruction to update. In some embodiments, the product database 114 stores update information that indicates the last date and time the product and service information was updated. In some embodiments, the product database 114 stores products and services based on settings determined by a system administrator. Alternatively or additionally, the product database 114 stores products and services based on a user's preferences stored in the customer database 112. The product database 114 may further store products based on the product item scanned by the product visualization application 116.

As described herein, the server computer 104 includes a product analyzer 118 and a product list generator 120. In some examples, the product analyzer 118 receives the scanned image of the product or service, over the network 110, and determines the category of the product or service and the type of product or service. However in other examples, the product analyzer 118 determines only the type of product or service without determining the category.

In an example, product analyzer 118 receives the product image from the product visualization application 116 and identifies the category under which the product belongs. Non-exclusive and non-limiting example categories may be a toy, a household appliance, a sporting good, an article of clothing, etc. In an example embodiment, category identification may be performed using shape recognition, text recognition of using any identifying markings on the product itself or the product packaging to identify the product category.

In another example, the product analyzer 118 may receive information about a category of a service from a variety of sources including, for example, an advertisement, a brochure, a store logo, etc. For example, a customer may scan a bank brochure to identify a category such as, for example financial services. In some embodiments, product and service detection aspects may be performed by the product visualization application 116 at the AR device 102.

Alternatively or additionally, the product analyzer 118 can, using various image processing techniques identify the specific type associated with the product or service, wherein the type more specifically characterizes the product or service. For example, using the example categories identified above, the product analyzer 118 can identify a product type. Non-exclusive and non-limiting example product types may be a teddy bear, a vacuum cleaner, a football, or a pair of running shoes. For the service example, the product analyzer 118 may identify a service type such as for example, savings accounts, checking accounts, financial counseling, etc.

The product analyzer 118 may further identify other product information such as, for example, brand information, product color, product size, and other specifications of the scanned product or service. In an example embodiment, category identification may be performed using shape recognition, text recognition of any identifying markings on the product itself, the product packaging, brochures, advertisements, etc.

The product analyzer 118 may further identify product tags to make such a determination such as, for example, the brand logo, barcode, etc. Alternatively or additionally, the product analyzer 118 may use a GPS unit of the AR device 102 to assist in identifying the product or service. For example, the product analyzer 118 may determine that the customer is in a particular store or financial institution based on the customer's location in determining the scanned product or service.

Alternatively or additionally, in some embodiments, product or service information detection aspects may be performed by the product visualization application 116 at the AR device 102. Although some examples describe the detection of products, it is understood that the present disclosure is not intended to be so limiting. Services may also be detected, however for purposes of example illustrations, products or services may be described without limitation.

A server computer 104 further includes an example product list generator 120. In an example, in response to receiving, from the product analyzer 118, at least one of the product category and type of the product or service, the product list generator 120 generates a list of one or more products or services that are comparable or related to the scanned product.

Alternatively or additionally, the product list generator 120 may use a GPS device of the AR device 102 to identify the location of the customer to identify available products or services. For example, if the product list generator 120 determines that the customer is located in a particular financial institution, the product list generator 120 can compile a list of services offered by that particular financial institution as well as services offered by other financial institutions. In an example, the product list generator 120 may generate the list of products or services by obtaining one or more products or services stored in the product database 114. Alternatively or additionally, the product list generator 120 queries one or more retail servers 106 to generate the list of one or more products or services.

The product list generator 120 may further use any customer preferences stored in the customer database 112 to generate the list. For example, the product list generator 120 may consider customer spending limit preferences as a guide in generating the list of products or services (e.g., do not show products that are 10% greater in price than the scanned product price). Alternatively or additionally, the product generator 120 may consider the customer's financial information stored in the customer database 112 to generate a list of products or services for which the customer is pre-qualified.

The product list generator 120 may further use the hints and any other relevant information, such as a customer purchase history to create a list of products or services the customer may be interested in purchasing. The customer purchase history can be obtained from, for example, the customer database 112. In some embodiments, the customer's financial health may also be determined from information stored in the customer database. The product list generator 120 can use the financial health status of the customer to determine customer's affordability of the products and services on the list. In some embodiments, the affordability of each product may be identified in the digital visualization wall.

Furthermore, in other embodiments, products or services that the customer cannot afford may not be displayed on the digital visualization wall. Such display preferences may be set by the customer. In some embodiments, the product list generator 120 generates a list of products and or services that it may send to the product visualization application 116 over the network 110. Alternatively or additionally, the product list generator 120 generates the digital visualization wall displaying the one or more products or services that it may send to the product visualization application 116 over the network 110.

The example social media server 108 may include one or more server computers that host social media sites. In some embodiments, the customer may access a social media site hosted by the one or more social media servers 108 to share the digital visualization wall or the scanned product, for example. The customer may access the social media site using the AR device 102. Alternatively or additionally, the customer's social media sites may be used to obtain hints regarding potential purchases of products and services by the customer.

Figure 2:
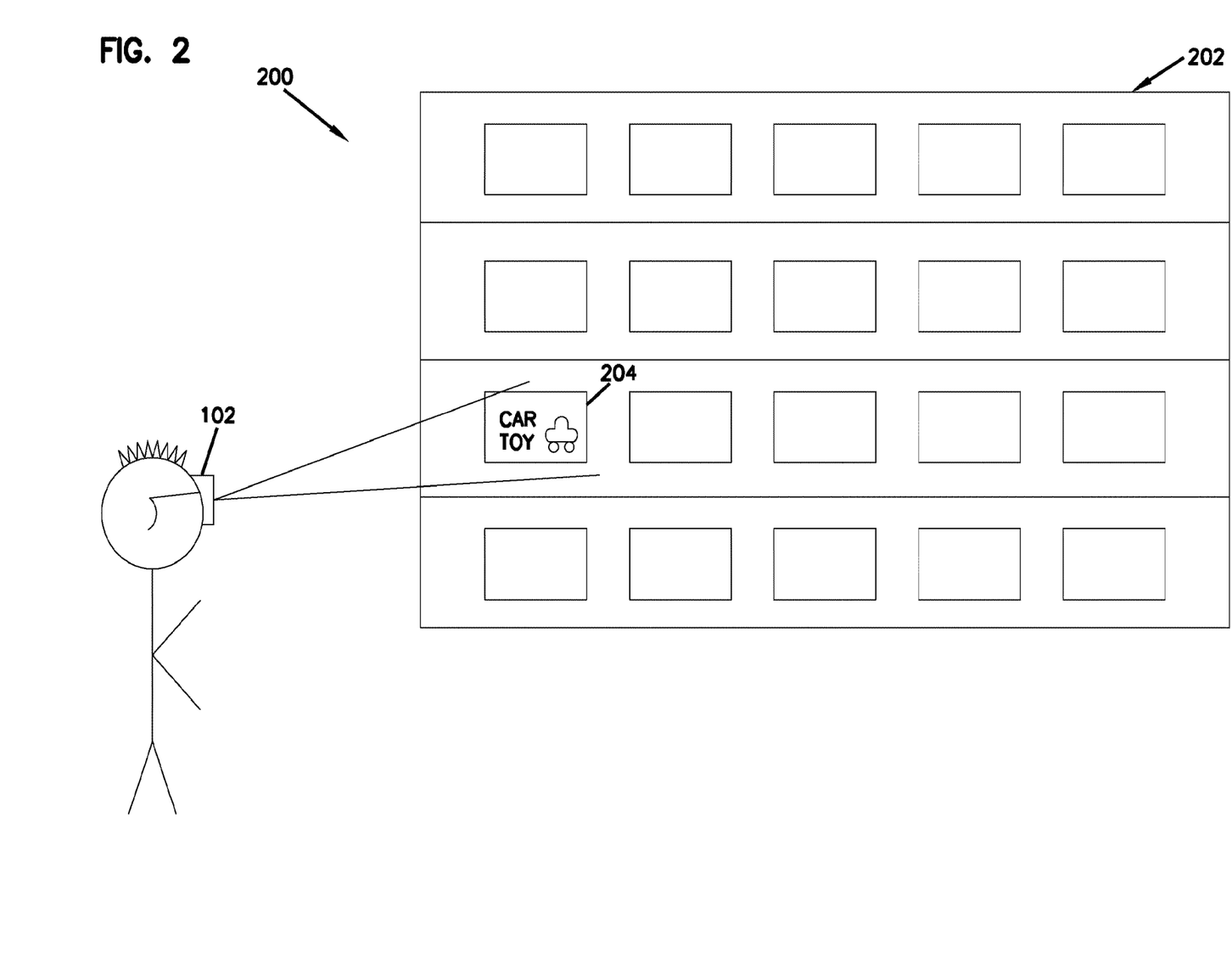
FIG. 2 shows an example scene as viewed from an AR device of the system of FIG. 1.

FIG. 2 shows an example scene 200 as viewed from the AR device 102.

The scene 200 is an example view of a store aisle 202. In this example, the aisle 202 includes four shelves, wherein each shelf stocks toys. In this example, the customer may use an AR device 102 to scan a product such as the car toy 204. As described herein, by scanning the car toy 204, the product visualization application 116 of the AR device 102 can detect a product, using, for example the camera of the AR device 102 to scan the product and to identify aspects of that product.

As also described herein, the product visualization application 116 or the product analyzer 118, can, using various image processing techniques, identify the category of the product and the product itself (example categories such as a toy, a household appliance, a sporting good, an article of clothing, and example products such as a teddy bear, a vacuum cleaner, a football, or a pair of running shoes). The product visualization application 116 or the product analyzer 118 may further identify other product information such as, for example, brand information, product color, product size, and other specifications of the scanned product. In an example embodiment, category identification may be performed using shape recognition, text recognition of any identifying markings on the product itself or the product packaging.

The product analyzer 118 may further identify identification product tags to make such a determination such as, for example, the brand logo, barcode, etc. Alternatively or additionally, in some embodiments, product information detection aspects may be performed by the product visualization application 116 at the AR device 102.

Still further, although FIG. 2 illustrates an example in which the customer is located in a store, the embodiments of the present disclosure are not intended to be so limiting. In other embodiments, the customer may scan an image of an advertisement and receive a digital visualization wall of information relating to comparable products and even the scanned picture of the product. In other embodiments, the customer may be in a financial institution and the customer may simply scan the logo of the financial institution and receive a digital visualization wall of financial services.

Figure 3:
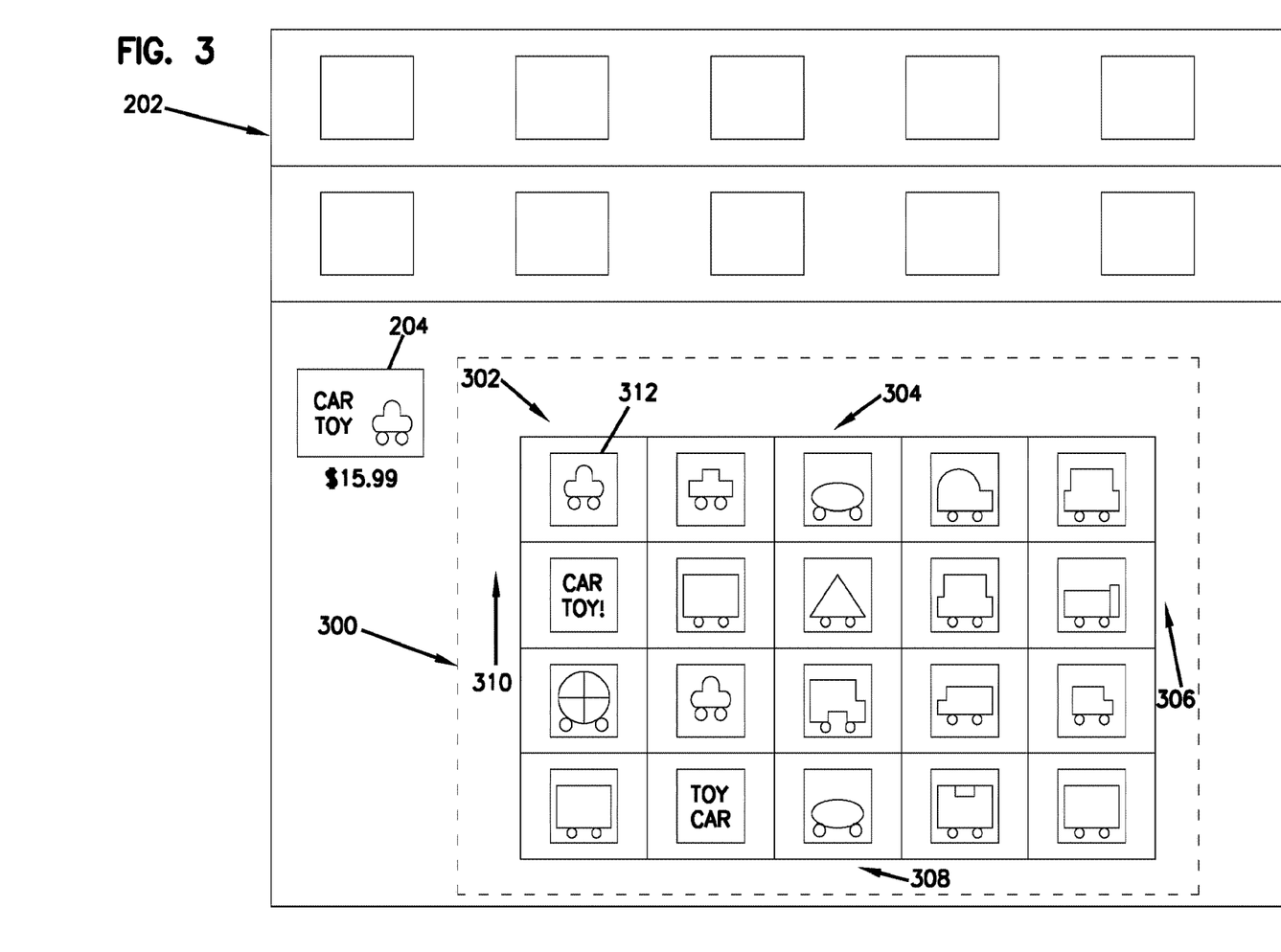
FIG. 3 illustrates an example digital visualization wall as viewed from the AR device of FIG. 1.

FIG. 3 illustrates an example digital visualization wall 300 as viewed from the AR device 102.

As will be further described herein, a digital visualization wall 300 may be a digital display, as viewed from the AR device, of comparable or related products, services, or a combination of both. In this example, the digital visualization wall 300 displays the scanned product (e.g., car toy 204) and one or more comparable or related products 302. Comparable products or services may be, for example, products or services that are similar to the scanned product or service. For example, a comparable product to a toy car product may be another toy car product that is manufactured by the same company or another company. In another example, a scanned service may be a savings account offered by a financial institution. The digital visualization wall may display comparable services such as other savings accounts offered by the same or other financial institutions.

In other embodiments, the digital visualization wall 300 displays one or more related products or services. Related products or services may be products or services that are within the same category as the scanned product or service. In the example illustrated in FIG. 2, a toy car 204 is scanned, wherein the toy car product may belong to a toy category or even a toy vehicle. Accordingly, the digital visualization wall may display related toys such as, for example, other toy vehicles, such as, for example, a truck toy 304 provided in the digital visualization wall 300. Accordingly, the truck toy 304 would be related to the car toy 204 in that they are categorized under the same toy vehicle category.

In embodiments, the digital visualization wall 300 may display other toy vehicles that are manufactured by the same company or similar companies. In another example, a scanned service may be a savings account offered by a financial institution. The digital visualization wall may display related services such as other checking accounts, retirement savings accounts, or other financial accounts offered by the same or other financial institutions. Accordingly, a related product or service may be a product or service that is within the same category as the scanned product or service. In some embodiments, the customer may set the type of products or services displayed such as, for example, comparable products or services or related products or services.

Accordingly, the digital visualization wall allows customers to easily engage in comparison shopping of competitive products and services by automatically identifying comparable or related products or services. Furthermore, the digital visualization wall may be saved by the customer and shared with other customers. For example, the digital visualization wall may be saved to the customer's profile in the customer database 112 or it may be saved locally in the product visualization application 116 on the AR device 102. The customer may share the digital visualization wall with other customers using one or more social media sites that executed by the social media servers 108.

As described herein, the product visualization application 116 may receive, from the server computer 104, a list of one or more products and one or more virtual images associated with each of the one or more products. The product visualization application 116 may also receive product information such as, for example, product specifications, one or more product prices, and information regarding where the comparable product may be purchased (e.g., website URLs, store location information). In embodiments, the product visualization application 116 may use the virtual images, product information to generate the virtual display comprising the digital visualization wall. In some embodiments, the digital visualization wall further provides link information so that the customer may directly purchase the comparable product from the AR device 102.

The digital visualization wall 300 is a virtual grid or display case of products, services, or a combination thereof. In this example, an array of products 302 is shown, wherein the array of products 302 is represented as a grid (e.g., a 5×4 grid) having multiple items (e.g., 20 items) wherein each item is representative of one of the plurality of products or the plurality of services. In this example, the multiple items each represent a car toy. In some embodiments, different car toys are presented, and in other embodiments, the same car toy is presented. Yet in other embodiments, toys of the same category may be presented such as, for example, other vehicles like vans, trucks, bicycles, skate boards, etc. In other embodiments more or fewer products or services may be shown. In embodiments, such display of products is dictated by the customer's preference, which may be stored locally with the digital visualization application 116 of the AR device 102 or may be stored, for example, in the customer database 112. As illustrated, the digital visualization wall 300 is displayed as an overlay on the current view captured by the camera on the AR device 102. In particular, the digital visualization wall 300 is displayed adjacent to the car toy 204 in the aisle 202. In some embodiments, the position of the digital visualization wall 300 is dictated by the customer's surroundings, the customer's preferences, environmental factors, or any combination of factors. Alternatively, in other embodiments, the digital visualization wall 300 is displayed as a selectable view that could be displayed using the AR device 102, but is not displayed as an overlay on the current view.

In this example, the digital visualization wall 300 displays the scanned product (e.g., toy 204) and one or more comparable or related products 302. Based on the scanned product or service, the digital visualization wall 300 may display comparable or related products, services, or a combination of both. Thus, in some embodiments, the digital visualization wall 300 shows products, services, or both products and services that may be comparable or related to the scanned product or service. Although services are not physical objects that can be scanned, information that represent services can be scanned, such as, for example, scanning a business logo or signage, advertisement, brochure, or website, to detect and identify services offered at that store or other similar stores.

In this example embodiment, the digital visualization wall 300 is presented as an array of comparable and related products. Further included in this digital visualization wall 300 are prices associated with each product. In some embodiments, the digital visualization wall 300 is presented as a sphere, wherein one or more comparable products are arranged thereon. In other embodiments, other types of two- or three-dimensional configurations may be used to present the digital visualization wall 300. Furthermore, the digital visualization wall 300 may be scrollable. In particular, the digital visualization wall 300 may contain more products that can be displayed to the customer, so the customer may scroll through the digital visualization wall 300 using the AR device 102. In some embodiments, the customer may scroll through the digital visualization wall 300 using hand, head, or eye gestures.

The products of the digital visualization wall 300 may be sorted in a default arrangement (e.g., price, alphabetical by name, closest location, etc.). In some embodiments, the digital visualization wall 300 may be sorted in a particular order based on the product or service displayed. Furthermore, in an example, the customer may adjust the way in which the products of the digital visualization wall 300 are sorted and displayed on the digital visualization wall 300.

In some embodiments, the customer may change the way in which products are sorted using hand, head, eye gestures, or voice gestures, wherein the sort order may differ for the product or service. For example, for a financial service, the sort orders may depend on factors such as, for example, fees, interest rates, rewards, payment terms, etc. In a product example, the sort orders may depend on factors such as, for example, price, product specifications, availability, locations to purchase the product, etc. In the example illustrated in FIG. 3, the arrows 304-310 each represent a direction in which the digital visualization wall 300 may be moved so that the customer can navigate within the digital visualization wall. In some embodiments, these directions can be navigated using gestures such as, for example, hand, head, eye gestures, voice gestures, or any combination of gestures.

Furthermore, the product visualization application 116 may allow the customer to define one or more preset gestures that sort the digital visualization wall 300. In some embodiments, these preset gestures may differ for the type of product or service displayed on the digital visualization wall 300. For example, the customer may flip her head up to sort products of the digital visualization wall 300 by price while the same gesture may be used to sort financial services by interest rate. In other embodiments, the customer may zoom in or zoom out of the digital visualization wall 300 to show more or fewer products or services. In other embodiments, zooming in or zooming out may display more or fewer details related to the displayed products and services.

In the context of a wearable AR device, the gestures can be performed using either one or both hands of the customer. If the AR device is hand-held, the gestures could be performed, for example, using the hand holding the AR device. In this embodiment, one or more sensors on the AR device, such as an accelerometer, gyroscope and/or compass) can sense the gesture and cause the appropriate modifications to the digital visualization wall 300.

In some examples, the products 302 that are displayed on the digital visualization wall 300 can be filtered based upon various criteria, such as information associated with the customer (e.g., age, gender, nationality, location, previous preferences, etc.). For example, if the customer is less than 18 years in age, products that are only appropriate for adult customers would be filtered out and not displayed on the digital visualization wall 300.

In this example, the digital visualization wall 300 displays four products 302. Each product may be selectable, providing more details and purchasing options. For example, selection of the car toy 312 may cause the product visualization application 116 to display another digital visualization wall from the AR device 102. An example of such detail is illustrated in FIG. 4.

Figure 4:
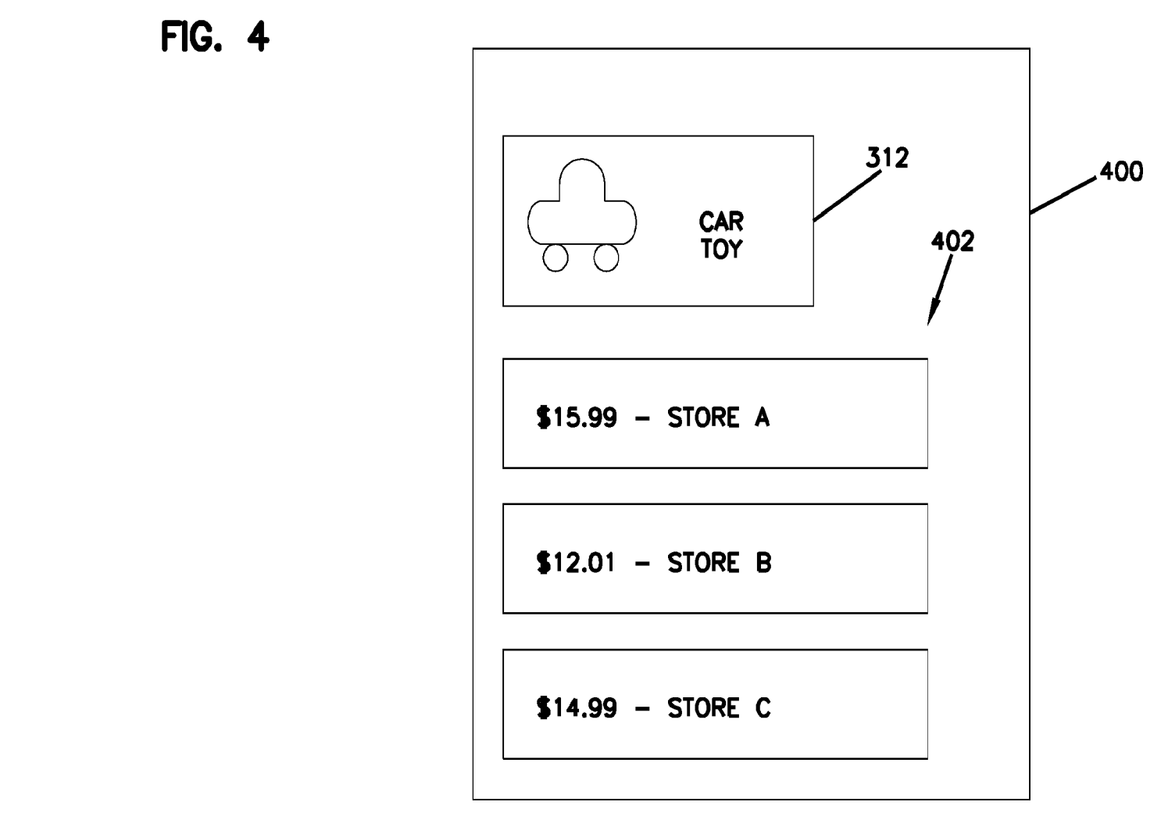
FIG. 4 illustrates another example digital visualization wall that is displayed using the AR device of FIG. 1 in response to a selection of a product or service.

FIG. 4 illustrates another example digital visualization wall 400 that is displayed using the AR device 102 in response to a selection of a product or service.

In the example provided, digital visualization wall 400 may be displayed in response to a selection of the car toy 312 from digital visualization wall 300 illustrated in FIG. 3. In this example, digital visualization wall 400 displays the product 312 as well as corresponding purchase information 402. In this example, the purchase information 404 includes three selectable options that each indicate the business from which the product can be purchased and the related product price.

As indicated in FIG. 3, the car toy 312 is associated with an $11.99 price. In FIG. 4, the digital visualization wall 400 shows three stores selling that car toy 312, wherein each store includes a different corresponding price (e.g., Store A sells the car toy 312 for $11.99, Store B sells the car toy 312 for $12.01, and Store C sells the car toy 312 for $14.99). Accordingly, in some embodiments, the digital visualization wall 300 of FIG. 3 may display the lowest price while the more detailed digital visualization wall 400 may show additional pricing information. In some embodiments, selection of one of the options directs the customer to the business's website and allows the customer to purchase that product. In some embodiments, the server computer 104 executes the purchase using the customer account information stored in the customer database 112.

In some embodiments, additional information is provided, such as the location of the nearest alternative stores carrying the product. This can include bibliographic information like location, directions, store hours etc.

Alternatively or additionally, the product visualization application 116 executes the purchase using the customer account information (e.g., credit card or bank information) stored in the customer database 112. In either embodiment, selection of one of the options allows the customer to purchase the product directly from the digital visualization wall. Alternatively or additionally, selection of one of the options provides the user with location information of the nearest business where the customer may purchase the product or a website URL that directs the customer to the business or other website. In particular, the nearest location of the business may be displayed on a map as well as directions from the customer's location. Business hours and contact information may also be provided.

In this example, the products 302 (e.g., car toy 312) displayed on the visualization wall 300 can take a variety of forms. In one example, each of the products 302 is represented by a static image, such as a JPEG, GIF, etc. In another example, each of the products 302 is represented by a dynamic media format, such as an animated image audio, and/or video file, like an MPEG or MP4 video. In that example, the customer can select one or more of the products 302 to activate the dynamic content, such as to watch a video depicting information about the selected product. Other configurations are possible.

Figure 5:
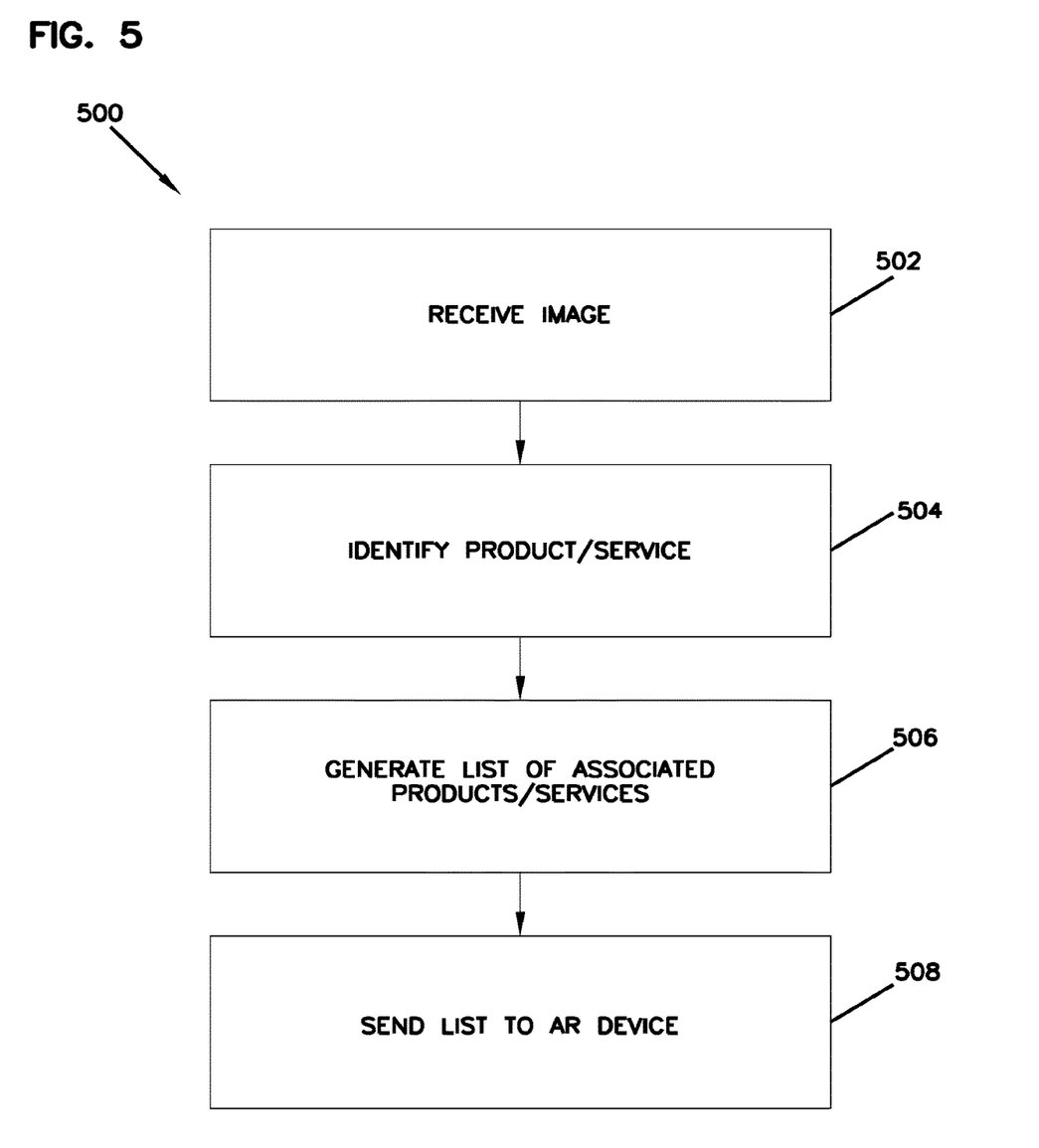
FIG. 5 illustrates an example method for displaying a digital visualization wall on an AR device.

FIG. 5 illustrates a method 500 for displaying a digital visualization wall on an AR device.

Method 500 may be performed by a server computer such as server computer 104. Method 500 starts at operation 502 in which the server computer receives one or more scanned images of the product or service. An AR device such as AR device 102 may be used to detect a product or a service. In particular, the camera of the AR device may scan an actual product, product specifications, a bar code, an advertisement, a URL, a store logo, etc. In operation 502, the server computer may receive, from the AR device, one or more scanned images of a product or service.

At operation 504, the server computer identifies the product or service in response to receiving the one or more images of the product or service in operation 502. In particular, the server computer may include a product analyzer such as product analyzer 118 that uses the one or more scanned images of the product or service to determine the category of the product or service and the type of product or service. Example categories may be, for example, a toy, a household appliance, a sporting good, an article of clothing, etc. In an example embodiment, category identification may be performed using shape recognition, text recognition of any identifying markings on the product itself or the product packaging.

Furthermore, the example product analyzer can, using various image processing techniques identify the specific type of product or service that characterizes the product or service itself. Example types may be a teddy bear, a vacuum cleaner, a football, or a pair of running shoes. The example product analyzer may also identify other product information such as, for example, brand information, product color, product size, and other specifications of the scanned product or service. In an example embodiment, identification of the type of the product or service may be performed using shape recognition, text recognition, any identifying markings on the product itself or the product packaging, etc.

The product analyzer may further identify product tags to make such a determination such as, for example, the brand logo, barcode, etc. Alternatively or additionally, the product analyzer may identify store logo information to identify a store selling services in order to identify one or more services. Alternatively or additionally, the product analyzer may use a GPS unit of the AR device to assist in identifying the customer's location to identify the product or service.

At operation 506, the server computer may generate a list of products, services, or a combination of both that will be displayed on the digital visualization wall. In particular, the server computer may include a product list generator such as product list generator 120. In an example, in response to receiving, from the product analyzer, at least one of the product category and type of the product, the product list generator may generate a list of one or more products or services that are comparable or related to the scanned product or service. Alternatively or additionally, the product list generator may use a GPS device of the AR device to identify the location of the customer to identify available products or services.

For example, if the product list generator determines that the customer is located in a particular financial institution, the product list generator can compile a list of services offered by that particular financial institution as well as other financial institutions. In another example, the product list generator may generate the list of products or services by obtaining one or more products or services stored in the product database such as product database 114. Alternatively or additionally, the product list generator may query one or more retail servers such as retail server 106 to generate the list of one or more products or services. The product list generator may further use customer preferences stored in the customer database such as customer database 112 in generating the list. For example, the product list generator may consider customer spending limit preferences as a guide in generating the list of products or services. Alternatively or additionally, the product generator may consider the customer's financial information stored in the customer database to generate a list of products or services for which the customer is pre-qualified.

The product list generator may further use the hints and any other relevant information, such as a customer purchase history to create a list of products or services the customer may be interested in purchasing. The customer purchase history can be obtained from, for example, the customer database. In some embodiments, the customer's financial health may also be determined from information stored in the customer database. The product list generator can use the financial health status of the customer to determine customer's affordability of the products and services on the list.

In some embodiments, the product list generator of the server computer may additionally generate the digital visualization wall and populate it with the products, services, or both.

In operation 508, the server computer sends the product list generated in operation 506 to the product visualization application. In particular, the product list generator may generate a list of products or services that it may send to the product visualization application over a network such as network 110. Alternatively or additionally, the product list generator may generate the digital visualization wall displaying the one or more products or services that it may send to the product visualization application.

Figure 6:
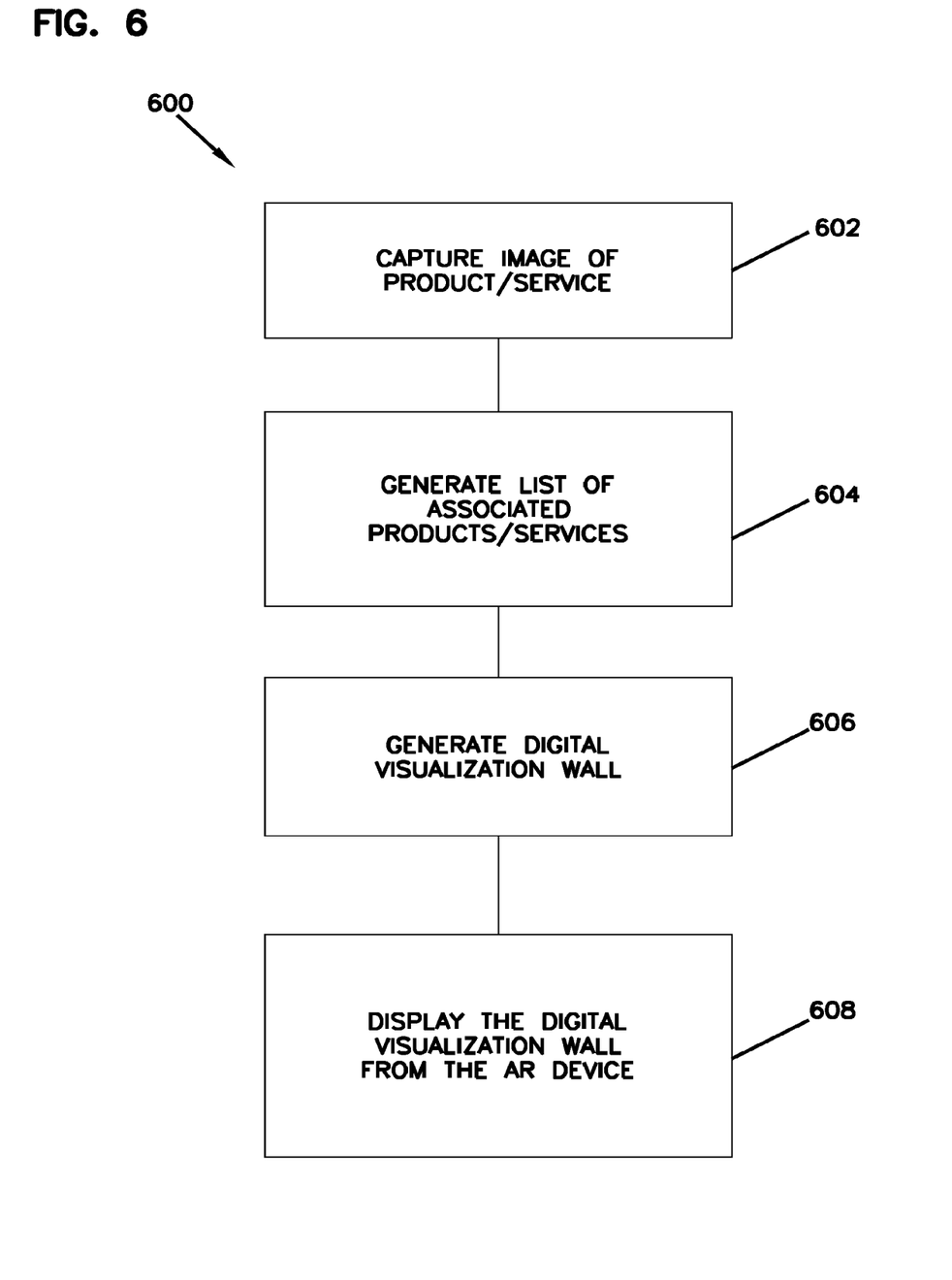
FIG. 6 illustrates another example method for displaying a digital visualization wall on an AR device.

FIG. 6 illustrates an example method 600 for displaying a digital visualization wall on an AR device.

Method 600 may be performed by a product visualization application such as product visualization application 116 executing on an AR device. Method 600 starts at operation 602 in which the product visualization application instructs the camera of the AR device to scan one or more images of a product or service. In some embodiments, the customer instructs the product visualization application to scan a particular product or service. As described herein, the AR device may scan an actual product, product specifications, a bar code, an advertisement, a URL, a store logo, etc.

At operation 604, the product visualization application sends, over a network, the one or more scanned images to a server computer, such as server computer 104. As described herein, in some embodiments, the server computer may identify the product or service based on the images scanned by the product visualization application.

At operation 604, the product visualization application generates a list of a plurality of products, services, or a combination of both products and services. In some embodiments, the product visualization application generates the list by querying retail servers, a product database (e.g., product database 114). In other embodiments, the product visualization application receives a list of products, services, of both from the server computer.

In operation 606, the product visualization application generates the digital visualization wall. In embodiments in which the product visualization application generates or receives a list of products or services, the product visualization application generates the digital visualization wall. In some embodiments, the product visualization application uses the customer's preferences stored in the product visualization application or the customer's preferences stored in the customer database, such as customer database 112 to determine the configuration of the digital visualization wall. If no such preferred configurations are identified, the product visualization application may arrange the one or more products or services according to a default arrangement such as, for example, an array, a list, or a sphere. In other embodiments, other arrangements are used.

Furthermore, the product visualization application may identify the customer's preferences regarding the order in which to sort the one or more products or services on the digital visualization wall. If no such preferred sort order is identified, the product visualization application may use a default sort order such as, for example, listing products or services according to ascending prices or fees. As described herein, other preferences may be taken into consideration when generating the digital visualization wall. For example, a customer's financial health may be considered when determining products to display on the digital visualization wall. For example, products having a price outside of the customer's budget range might not be displayed on the digital visualization wall.

Alternatively or additionally, a customer may choose to only display products or services from preselected stores or websites. Alternatively or additionally, varying levels of detail may be displayed on the digital visualization wall. As described herein, selection of a particular product or service from the digital visualization wall may unearth additional details relating to that selected product or service, including the store or website in which to purchase the product or service, price information, specifications, etc. Accordingly, in operation 608, the product visualization application may generate each such detailed view associated with each product or service. The product visualization application may further provide the ability to link to a particular website to purchase the selected product or service. In other embodiments, the product visualization application generates a purchasing view from which the product or service may be directly purchased. Alternatively, in some embodiments, the product visualization application may receive a digital visualization wall generated by the server computer, wherein the digital visualization wall displays one or more products or services.

At operation 608, the digital visualization wall generated in operation 606 is displayed on the AR device. As described herein, the digital visualization wall may be dynamically rendered in real-time such that it is automatically displayed in the customer's view. In some embodiments, the digital visualization wall is displayed adjacent to or near the scanned product or service. In other embodiments, the digital visualization wall is displayed in response to the customer's selection to view the wall. In some embodiments, the digital visualization wall can be laid atop the customer's surroundings. In some embodiments, the digital visualization wall is translucent.

Figure 7:
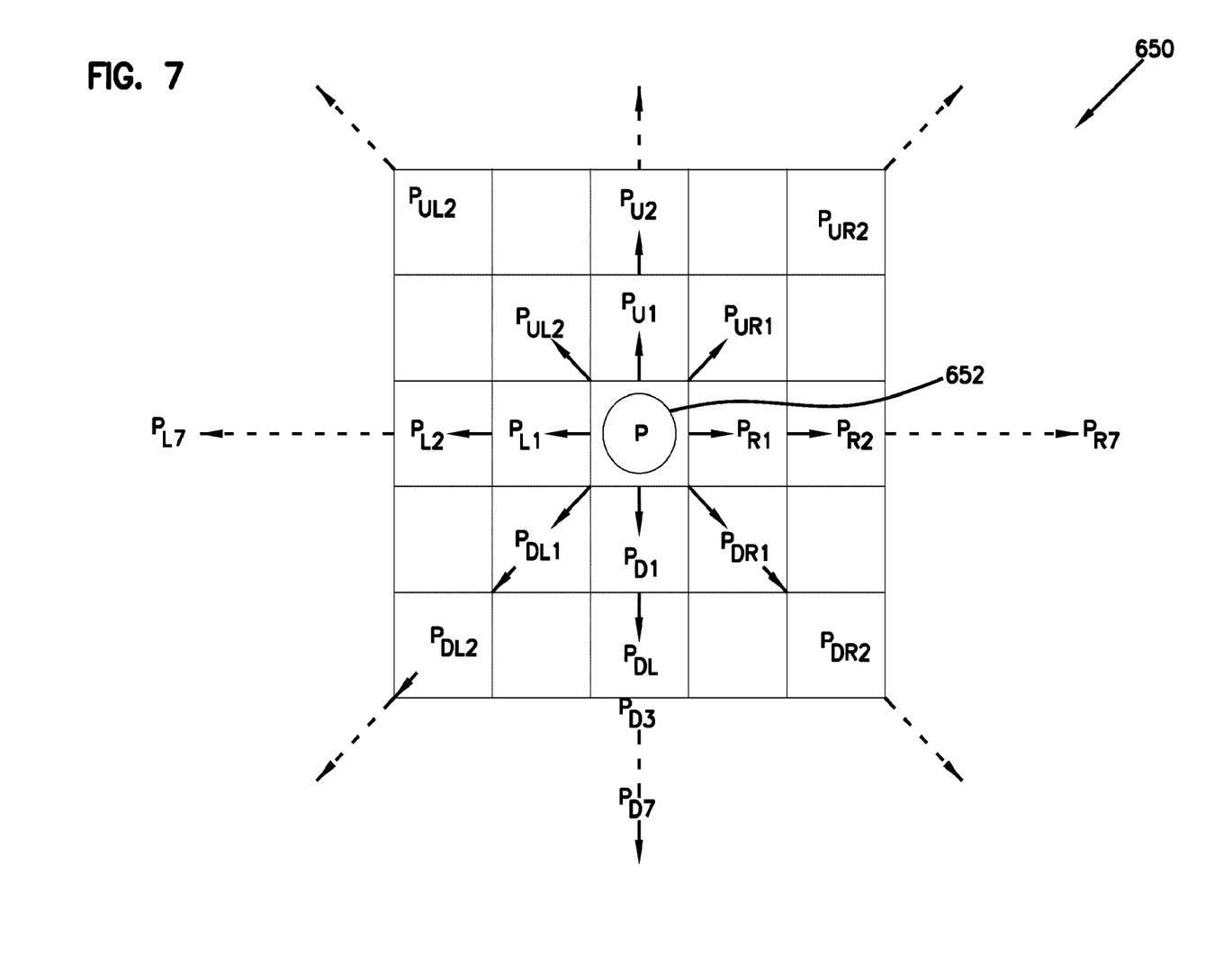
FIG. 7 illustrates another example digital visualization wall that is displayed using the AR device of FIG. 1 in response to a selection of a product or service.

Referring now to FIG. 7, another example digital visualization wall 650 is shown. The digital visualization wall 650 is similar to the digital visualization wall 300 described above, but includes more aspects related to preset gestures that allow the customer to control the digital visualization wall 650.

For example, assuming that the customer has selected a product 652 that is displayed in the center of the digital visualization wall 650. The digital visualization wall 650 is populated with related products.

As the user manipulates the digital visualization wall 650, various gestures or other input methods (e.g., touch, visual cues, etc.) can be used to manipulate what is shown on the digital visualization wall 650. For example, if the customer indicates a gesture in a PR1 . . . . PRn direction, the digital visualization wall 650 can be manipulated according to a first criteria, such as price. If the customer indicates a gesture in a PL1 . . . . PLn direction, then the digital visualization wall 650 can be manipulated according to a second criteria, such as features associated with the product. The other directions PU1, PUR1, etc. can be used to manipulate other criteria to dictate what is shown on the digital visualization wall 650. Other configurations are possible.

Figure 8:
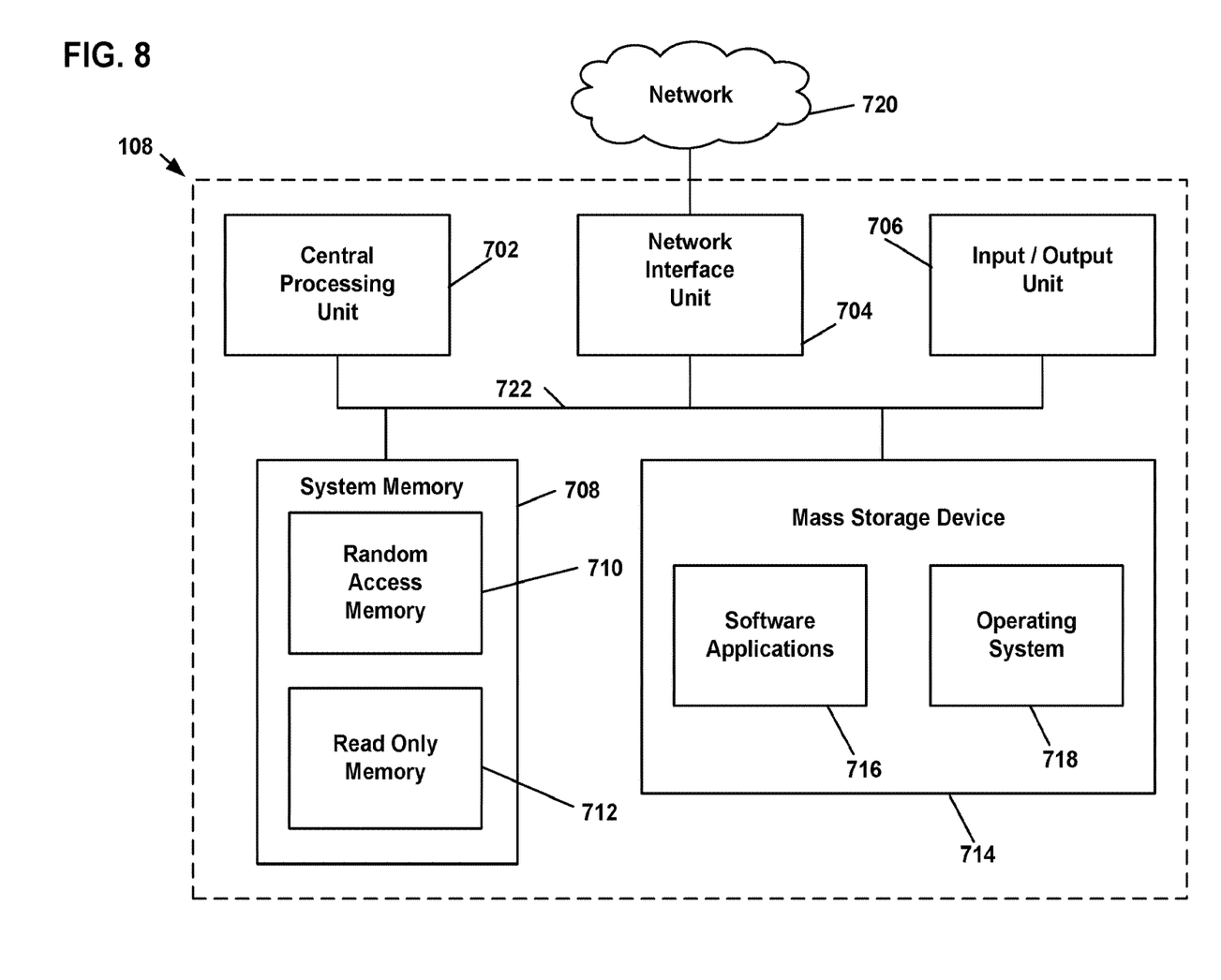
FIG. 8 illustrates example physical components of a server computer of the system of FIG. 1.

FIG. 8 illustrates example physical components of the server computer 104 of FIG. 1. AR device 102 can also include any or all of the components described below.

As illustrated in the example of FIG. 8, server computer 104 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the server computer 104, such as during startup, is stored in the ROM 712. The server computer 104 further includes a mass storage device 714. The mass storage device 714 is able to store software instructions and data. Some or all of the components of the server computer 104 can also be included in AR device 102.

The mass storage device 714 is connected to the CPU 702 through a mass storage controller (not shown) connected to the system bus 722. The mass storage device 714 and its associated computer-readable data storage media provide non-volatile, non-transitory storage for the server computer 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 104.

According to various embodiments of the invention, the server computer 104 may operate in a networked environment using logical connections to remote network devices through the network 720, such as a wireless network, the Internet, or another type of network. The server computer 104 may connect to the network 720 through a network interface unit 704 connected to the system bus 722. It should be appreciated that the network interface unit 704 may also be utilized to connect to other types of networks and remote computing systems. The server computer 104 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the server computer 104 can store software instructions and data. The software instructions include an operating system 718 suitable for controlling the operation of the server computer 104. The mass storage device 714 and/or the RAM 710 also store software instructions, that when executed by the CPU 702, cause the server computer 104 to provide the functionality of the server computer 104 discussed in this document. For example, the mass storage device 714 and/or the RAM 710 can store software instructions that, when executed by the CPU 702, cause the server computer 104 to display received data on the display screen of the server computer 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for identifying products using a server computer, the method comprising:
   receiving, at the server computer, an image associated with at least one of a product and a service selected by a customer;
   identifying, by the server computer, the at least one of the product and the service using:
   shape recognition to identify the at least one of the product and the service; and text recognition to identify any markings associated with the at least one of the product and the service;
receiving a location of the customer from a global positioning system device;
receiving financial information of the customer, including a spending limit preference of the customer;
determining a spending limit of the customer for the at least one of the product and the service identified by the server computer based on the spending limit preference of the customer;
generating, by the server computer, a list corresponding to the at least one of the product and the service identified by the server computer, the spending limit of the customer and the location, the list including at least one of: a plurality of products and a plurality of services, wherein each product or each service of the at least one of: the plurality of products and the plurality of services is within the spending limit of the customer;
generating a digital visualization wall including the plurality of products or the plurality of services, wherein the digital visualization wall is represented as a grid of items, wherein:
each item among the grid of items is representative of one of the plurality of products or the plurality of service, and
the grid of items is sorted according to price and is arranged for display within a space formed by an augmented reality environment of an augmented reality device; and
sending, from the server computer, the list and the digital visualization wall to the augmented reality device, where the digital visualization wall, including the grid of items, is displayed as a virtual image within the space formed by the augmented reality environment, and where the grid of items is rearranged upon receiving a gesture input from the customer navigating the digital visualization wall within the augmented reality environment.

2. The method of claim 1, further comprising:
identifying at least one of: a category and a type associated with the at least one of the product and the service.

3. The method of claim 1, wherein generating the list further comprises:
gathering the plurality of products and the plurality of services from a product database associated with the server computer.

4. The method of claim 1, wherein generating the list further comprises:
querying one or more retail servers in communication with the server computer to obtain the at least one of: the plurality of products and the plurality of services.

5. The method of claim 1, wherein the image is received from the augmented reality device.

6. The method of claim 1, further comprising:
saving the list in a customer database associated with the server computer; and
permitting one or more social media servers to access the list.

7. The method of claim 1, further comprising:
receiving an instruction to purchase at least one of the plurality of products and the plurality of services on the list; and
executing the purchase.

8. The method of claim 1, further comprising:
sorting the list according to the plurality of products and the plurality of services on the list.

9. A server computer, comprising:
a processing unit; and
system memory, the system memory including instructions which, when executed by the processing unit, cause the server computer to:
receive an image associated with at least one of a product and a service selected by a customer;
identify the at least one of the product and the service using:
shape recognition to identify the at least one of the product and the service; and
text recognition to identify any markings associated with the at least one of the product and the service;
receive a location of the customer from a global positioning system device;
receive financial information of the customer, including a spending limit preference of the customer;
determine a spending limit of the customer for the at least one of the product and the service identified by the server computer based on the spending limit preference of the customer;
generate a list corresponding to the at least one of the product and the service identified by the server computer, the spending limit of the customer and the location, the list including at least one of: a plurality of products and a plurality of services, wherein each product or each service of the at least one of: the plurality of products and the plurality of services is within the spending limit of the customer;
generate a digital visualization wall including the plurality of products or the plurality of services, wherein the digital visualization wall is represented as a grid of items, wherein:
each item among the grid of items is representative of one of the plurality of products or the plurality of services; and
the grid of items is sorted according to price is arranged for display within a space formed by an augmented reality environment of an augmented reality device; and
send the list and the digital visualization wall to the augmented reality device where the digital visualization wall, including the grid of items, is displayed as a virtual image within the space formed by the augmented reality environment and where the grid of items is rearranged upon receiving a gesture input from the customer navigating the digital visualization wall within the augmented reality environment.

10. The server computer of claim 9, comprising further instructions which, when executed by the processing unit, cause the server computer to:
identify at least one of: a category and a type associated with the at least one of the product and the service.

11. The server computer of claim 9, wherein generating the list further comprises:
gather the plurality of products and the plurality of services from a product database associated with the server computer.

12. The server computer of claim 9, wherein generating the list further comprises:
query one or more retail servers in communication with the server computer to obtain the at least one of: the plurality of products and the plurality of services.

13. The server computer of claim 9, wherein the image is received from the augmented reality device.

14. The server computer of claim 9, comprising further instructions which, when executed by the processing unit, cause the server computer to:
   save the list in a customer database associated with the server computer; and
permitting one or more social media servers to access the list.

15. The server computer of claim 9, comprising further instructions which, when executed by the processing unit, cause the server computer to:
   receive an instruction to purchase at least one of the plurality of products and the plurality of services on the list; and
   execute the purchase.

16. The server computer of claim 9, comprising further instructions which, when executed by the processing unit, cause the server computer to:
   sort the list according to the plurality of products and the plurality of services on the list.

\* \* \* \* \*